US010643366B1

(12) United States Patent
Short et al.

(10) Patent No.: US 10,643,366 B1
(45) Date of Patent: *May 5, 2020

(54) CONVERSION OF 2D DIAGRAMS TO 3D RICH IMMERSIVE CONTENT

(71) Applicant: Accenture Global Solutions Limited, Dublin (IE)

(72) Inventors: Matthew Thomas Short, San Jose, CA (US); Robert Dooley, Dublin, CA (US); Grace T. Cheng, Mountain View, CA (US); Sunny Webb, San Francisco, CA (US); Mary Elizabeth Hamilton, San Mateo, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,969

(22) Filed: Dec. 3, 2019

Related U.S. Application Data

(63) Continuation of application No. 16/216,531, filed on Dec. 11, 2018, now Pat. No. 10,535,172, which is a continuation of application No. 16/037,660, filed on Jul. 17, 2018, now Pat. No. 10,198,843.

(60) Provisional application No. 62/535,401, filed on Jul. 21, 2017.

(51) Int. Cl.
| | |
|---|---|
| *G06T 13/20* | (2011.01) |
| *G06K 9/00* | (2006.01) |
| *G06K 9/62* | (2006.01) |
| *G06T 19/20* | (2011.01) |
| *G06T 15/20* | (2011.01) |
| *G06T 19/00* | (2011.01) |

(52) U.S. Cl.
CPC .......... *G06T 13/20* (2013.01); *G06K 9/00724* (2013.01); *G06K 9/6267* (2013.01); *G06T 15/20* (2013.01); *G06T 19/20* (2013.01); *G06T 19/006* (2013.01)

(58) Field of Classification Search
CPC ......... G06T 13/20; G06T 15/20; G06T 19/20; G06T 19/006; G06K 9/6267
See application file for complete search history.

(56) References Cited

U.S. PATENT DOCUMENTS

| | | | |
|---|---|---|---|
| 9,584,653 B1* | 2/2017 | Lyren .................. | G06F 3/04817 |
| 2011/0064388 A1* | 3/2011 | Brown .................... | G06T 13/20 |
| | | | 386/285 |
| 2011/0090344 A1* | 4/2011 | Gefen .................... | H04N 5/232 |
| | | | 348/169 |
| 2014/0219550 A1* | 8/2014 | Popa .................. | G06K 9/00342 |
| | | | 382/154 |

(Continued)

*Primary Examiner* — Abderrahim Merouan
(74) *Attorney, Agent, or Firm* — Fish & Richardson P.C.

(57) ABSTRACT

Implementations are directed to methods, systems, apparatus, and computer programs for generation of a three-dimensional (3D) animation by receiving a user input defining a two-dimensional (2D) representation of a plurality of elements, processing, by the one or more processors, the 2D representation to classify the plurality of elements in symbolic elements and action elements, generating, by the one or more processors, based on the symbolic elements, the action elements, and a set of rules a 3D animation corresponding to the 2D representation, and transmitting, by the one or more processors, the 3D animation to an extended reality device for display.

20 Claims, 7 Drawing Sheets

(56) References Cited

U.S. PATENT DOCUMENTS

| | | | |
|---|---|---|---|
| 2014/0323148 A1* | 10/2014 | Schmalstieg | G01V 3/38 455/456.1 |
| 2015/0070351 A1* | 3/2015 | Tarquini | G06T 13/40 345/419 |
| 2015/0348316 A1* | 12/2015 | Porcino | G06T 7/40 345/426 |
| 2016/0086365 A1* | 3/2016 | Petti | G06T 13/00 345/474 |
| 2017/0091993 A1* | 3/2017 | Andrew | G06F 3/04812 |
| 2017/0146319 A1* | 5/2017 | Lyren | G06T 7/20 |
| 2017/0366866 A1* | 12/2017 | Davies | H04N 21/42202 |
| 2017/0366867 A1* | 12/2017 | Davies | H04N 21/854 |
| 2018/0124371 A1* | 5/2018 | Kamal | H04N 5/247 |
| 2018/0154232 A1* | 6/2018 | Gentil | G06T 7/254 |
| 2018/0253895 A1* | 9/2018 | Arumugam | G06K 9/00208 |

* cited by examiner

CONVERSION OF 2D DIAGRAMS TO 3D RICH IMMERSIVE CONTENT

CROSS-REFERENCE TO RELATED APPLICATION

This application is a continuation of U.S. application Ser. No. 16/216,531, filed Dec. 11, 2018, which is a continuation of U.S. application Ser. No. 16/037,660, filed Jul. 17, 2018, now U.S. Pat. No. 10,198,843, issued Feb. 5, 2019, which claims the benefit of U.S. Provisional Application No. 62/535,401, filed Jul. 21, 2017, and titled "Conversion of 2D Diagrams to 3D Rich Immersive Content." All of these prior applications are incorporated by reference in their entirety.

BACKGROUND

Visualization of plans plays a critical role in today's society. Recent advances in mobile network technologies and their multimedia capability coupled with the emergence of reliable standards in mobile devices has given users the ability to draft two-dimensional (2D) plans depicting multiple moving elements using computing devices. Plans can be transmitted for visualization to multiple users. However, not all users might have the skills to correctly interpret the plans. Additionally, plans can include hidden errors or limitations that a user might not be able to identify.

SUMMARY

Implementations of the present disclosure are generally directed to dynamically generating 3D animations. More particularly, implementations of the present disclosure are directed to using a 2D illustration for dynamically generating 3D animations.

In some implementations, actions include receiving a user input defining a two-dimensional (2D) representation of a plurality of elements, processing, by the one or more processors, the 2D representation to classify the plurality of elements in symbolic elements and action elements, generating, by the one or more processors, based on the symbolic elements, the action elements, and a set of rules a 3D animation corresponding to the 2D representation, and transmitting, by the one or more processors, the 3D animation to an extended reality device for display. Other implementations of this aspect include corresponding systems, apparatus, and computer programs, configured to perform the actions of the methods, encoded on computer storage devices.

These and other implementations can each optionally include one or more of the following features: operations can further include determining an identity of each of the symbolic elements; operations can further include retrieving characteristics for each of the symbolic elements based on the identity of each of the symbolic elements; the action elements include a vector for each of the plurality of elements indicating a direction and a speed of displacement of each of the plurality of elements; the set of rules includes spatial limitations associated to displacements of the symbolic elements; operations can further include updating the 2D representation based on a second user input modifying of at least one of plurality of elements within the 3D animation; operations can further include generating a perspective of the 3D animation associated to one of the symbolic elements based on a second user associated with the extended reality device.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

Like reference symbols in the various drawings indicate like elements.

DETAILED DESCRIPTION

Figure 1:
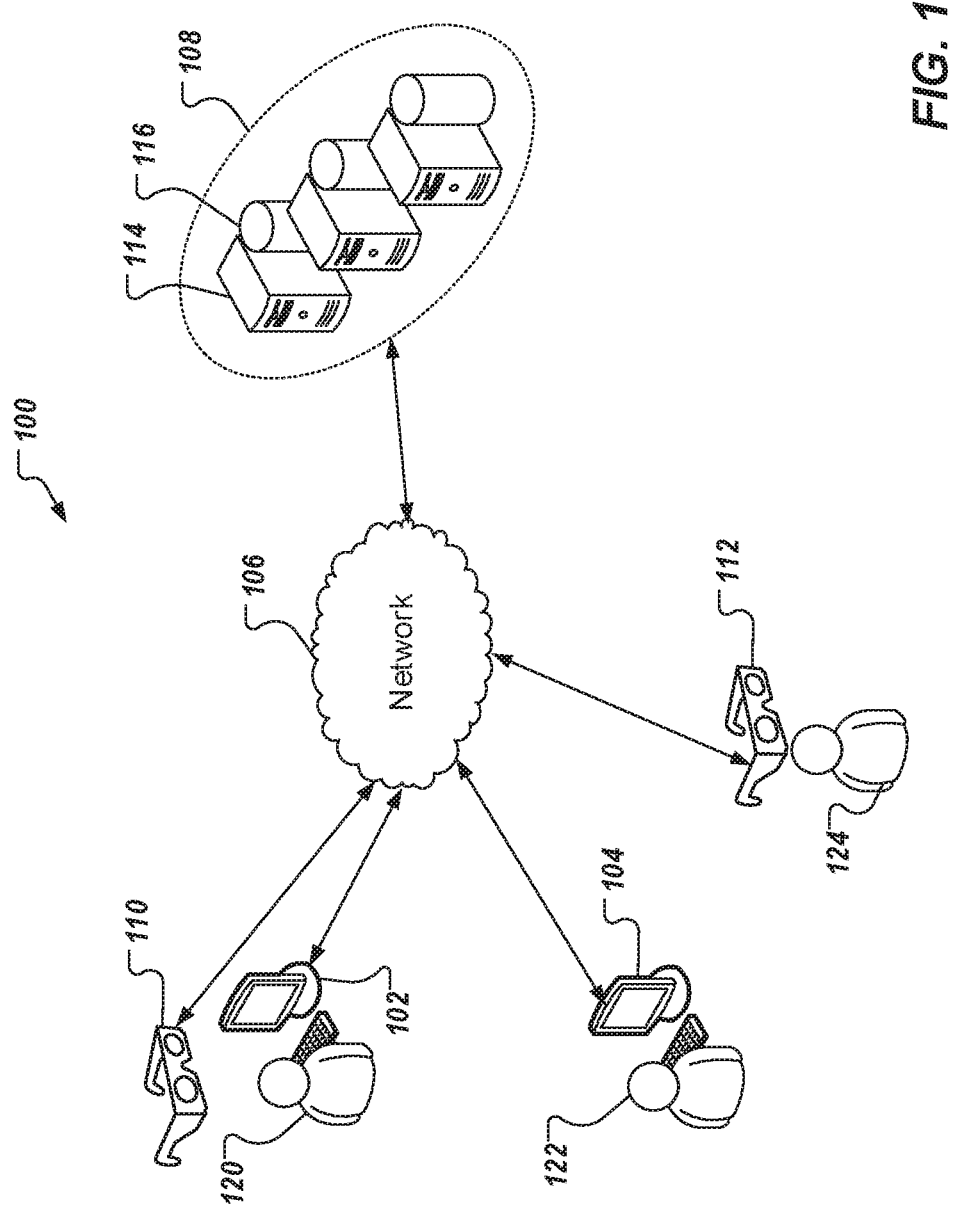
FIG. 1 depicts an example high-level architecture in accordance with implementations of the present disclosure.

Implementations of the present disclosure are generally directed to dynamically generating 3D animations. More particularly, implementations of the present disclosure are directed to using a 2D illustration for dynamically generating 3D animations of a plan (scenario) including the movement of multiple elements. The 3D animation of the plan can be visualized using one or more devices via an augmented reality (AR) display, a virtual reality (VR) display, a mixed reality (MR), or an extended reality (XR) display which may include or combine AR, VR, and MR displays. The techniques described in this disclosure can provide virtualization of a real-world setting (referred to as a virtual or virtualized location) and real-world symbolic elements (referred to as a virtual or virtualized symbols), using, in part, an illustration that describes the characteristics of the symbolic elements and how they can interact with each other within the real-world setting. The illustration defines a mapping from user input detected by a mobile device displaying a 2D representation of the plan and an XR device displaying the 3D animation of the plan.

As described in further detail herein, implementations of the present disclosure include receiving a user input defining a two-dimensional (2D) representation of a plurality of elements, processing, by the one or more processors, the 2D representation to classify the plurality of elements in symbolic elements and action elements, generating, by the one or more processors, based on the symbolic elements, the action elements, and a set of rules a 3D animation corresponding to the 2D representation, and transmitting, by the one or more processors, the 3D animation to an extended reality device for display.

A challenge associated with visualization of 2D representations of plans is that not all users have the skills to correctly interpret the plans illustrated in 2D. For example, not all users have the skills to envision the flow of actions associated to a symbolic element along a timeline relative to the other symbolic elements when seeing a 2D representation from a general perspective. Some 2D representations of plans can include errors that are not directly obvious and might be overlooked. The errors can be related to the position of one or more symbolic elements at a particular time along the timeline. The errors can include an overlap of positions of two or more elements at a point in time, unintended or unpermitted interactions between two or more elements, or other position-time combinations that break one or more rules. Accordingly, the use of 2D representations of plans can be impractical, because a correct implementation of the plan may be hindered.

As described in further detail herein, implementations of the present disclosure address this challenge. For example, in accordance with implementations, a conversion of a 2D representation of a plan to a 3D animation can enhance the ability of users to understand the plan. A display of the 3D animation of the plan based on a perspective associated with one of the symbolic elements included in the plan can enhance the ability of a user to understand the plan from the displayed perspective (e.g., emulating the view of a person or player).

Implementations of the present disclosure will be described in further detail herein with reference to an example context. Within the example context, the plan can describe the actions of a group of people (e.g., an athletic team, actors playing in a show or a movie), interactions between devices (e.g., robots or remotely controlled devices) and people, physical or chemical interactions of substances brought in contact with each other, interactions between electrical networks, or displacement of a fleet (e.g., marine fleet, air fleet, ground fleet). However, the implementations of the present disclosure can be realized in any appropriate context.

FIG. 1 depicts an example system 100 that can execute implementations of the present disclosure. The example system 100 includes computing devices 102, 104, a back-end system 108, a network 106, and 3D viewing devices 110, 112. The computing devices 102, 104, the back-end system 108, and 3D viewing devices 110, 112 can communicate over the network 106. In some implementations, the network 106 includes a local area network (LAN), wide area network (WAN), the Internet, or a combination thereof, and connects web sites, devices (e.g., the computing device 102, 104), and back-end systems (e.g., the back-end system 108). In some implementations, the network 106 can be accessed over a wired and/or a wireless communications link. For example, mobile computing devices, such as smartphones can utilize a cellular network to access the network 106.

In the depicted example, the back-end system 108 includes at least one server system 114, and data store 116 (e.g., database). In some implementations, one or more components of the back-end system 108 may be configured to operate within environments, including cloud-computing-based, local, global, or other environment (or a combination of environments). The at least one server system 114 can host one or more computer-implemented services that users can interact with using computing devices 102, 104. For example, the server system 114 can host a computer-implemented service or a set of cloud services for converting a 2D representation of a plan to a 3D animation in accordance with implementations of the present disclosure. The set of cloud services can be accessible over one or more networks (e.g., the Internet) by the server system 114. The cloud services include services designed for converting a 2D representation of a plan to a 3D animation and enable visualization of the 3D animation by users who are at different locations. In some implementations, the cloud services can include social network platforms (e.g., TWITTER, FACEBOOK, GOOGLE+, or blogs), and other types of cloud services (e.g., a weather data service, a news service, or any other type of service).

The computing device 102 and the 3D viewing device 110 can be operated by a user 120, the computing device 104 can be operated by a user 122, and the 3D viewing device 112 can be operated by a user 124. In some implementations, the computing devices 102, 104 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

The 3D viewing devices 110, 112 can be configured to be synchronized to enable a simultaneous visualization of a 3D animation and/or configured to be independent from each other to enable visualizations of the 3D animation at different times. The 3D viewing devices 110, 112 can enable optical superposition of digital information onto the direct view of the physical world (e.g., a game field) and maintain (or optionally block) see-through vision to the real world. In some implementations, the 3D viewing device 110 can include glasses configured to display an animation received from a computing device (e.g., computing device 102) as 3D images at a particular frame rate. For example, the 3D viewing device 110 can include stereoscopic glasses with chromatically opposite filters in each lens that transform an image displayed by a computing device (e.g., computing device 102) in a 3D image. In some implementations, the 3D viewing device 110 can be coupled (e.g., through a wired or wireless connection) with the computing device 102. The 3D viewing device 110 can by synchronized with a refresh rate and/or frame rate of the computing device 102 such that left eye and right eye shutters of the 3D viewing device 110 alternately block and transmit light from the display in synchronization with the computing device 102 display's refresh rate. In such implementations, the embedded 3D information can be contained in alternately displayed left eye and right eye images of the 3D information that are embedded in the respective target image (e.g., a frame of a 3D animation).

In some implementations, the 3D viewing devices 110, 112 can include wearable devices with a non-stereoscopic display method. The 3D viewing devices 110, 112 can include a lightweight optical see-through head-mounted display (OST-HMD) configured to provide a virtual 3D image for display to a user. For example, the 3D viewing devices 110, 112 can include display optics configured to project a 3D image. The display optics can be configured to receive optical radiation from a microdisplay and can be configured to create a 3D lightfield, that is, a true optically reconstructed 3D real or virtual object from the received radiation. The term 3D lightfield is defined as the radiation field of a 3D scene including a collection of light rays appearing to be emitted by the 3D scene to create the perception of a 3D scene. The 3D viewing devices 110, 112 can include an eyepiece in optical communication with the display optics. The eyepiece can be configured to receive the 3D lightfield from the display optics and deliver the received radiation to an exit pupil of the system to provide a virtual display path. The eyepiece can include a selected surface configured to receive the 3D lightfield from the display optics and reflect the received radiation to an exit pupil of the system to provide a virtual display path. The selected surface may also be configured to receive optical radiation from a source other than the microdisplay and to transmit such optical radiation to the exit pupil to provide a see-through optical path. The eyepiece can include a freeform prism shape. Further details about the components of the 3D viewing devices 110, 112 are provided with respect to FIG. 3.

In some implementations, the computing devices 102, 104 and one or more of the 3D viewing devices 110, 112 can include one or more features that enable one or more users 120, 122, 124 of the devices to modify the displayed 2D or 3D images. For example, the computing devices 102, 104 and one or more of the 3D viewing devices 110, 112 can be configured to enable a user identified (e.g., through user ID) as being a developer or manager of the plan to modify any of the displayed 2D or 3D images. As another example, the 3D viewing devices 110, 112 can be configured to prevent a user identified (e.g., through user ID) as being an executant of the plan from modifying any of the displayed 2D or 3D images. The computing devices 102, 104 and the 3D viewing devices 110, 112 can be responsive to, and can record user input and transmit the modification over the network 106 to update the images displayed by all devices. In some implementations, the 3D viewing devices 110, 112 can directly communicate modifications received from a user 120 to the backend system 108 over the network 106, for example. In some implementations, the 3D viewing devices 110, 112 can transmit modifications received from a user 120 to one or more intermediate computing devices 102 for example, and the one or more intermediate computing devices 102 can transmit the modifications received from a user 120 to the backend system 108 over the network 106.

As discussed in further detail herein, the backend system 108 can process the 2D representations of a plan to generate a 3D animation and can process the modifications to update the 2D representation of the plan and one or more frames of the 3D animation. The backend system 108 can process the 2D representations of a plan based on one or more rules (e.g., avoid collision of particular symbolic elements within the plan) and identify symbolic elements and action elements that can be in conflict with the one or more rules. The backend system 108 can be configured to trigger a notification on one or more computing device 102, 104, when a rule conflict is detected. In some implementations, the backend system 108 can be configured to determine an alternative animation that is as similar as possible to the initial animation and does not generate a rule conflict.

Figure 2:
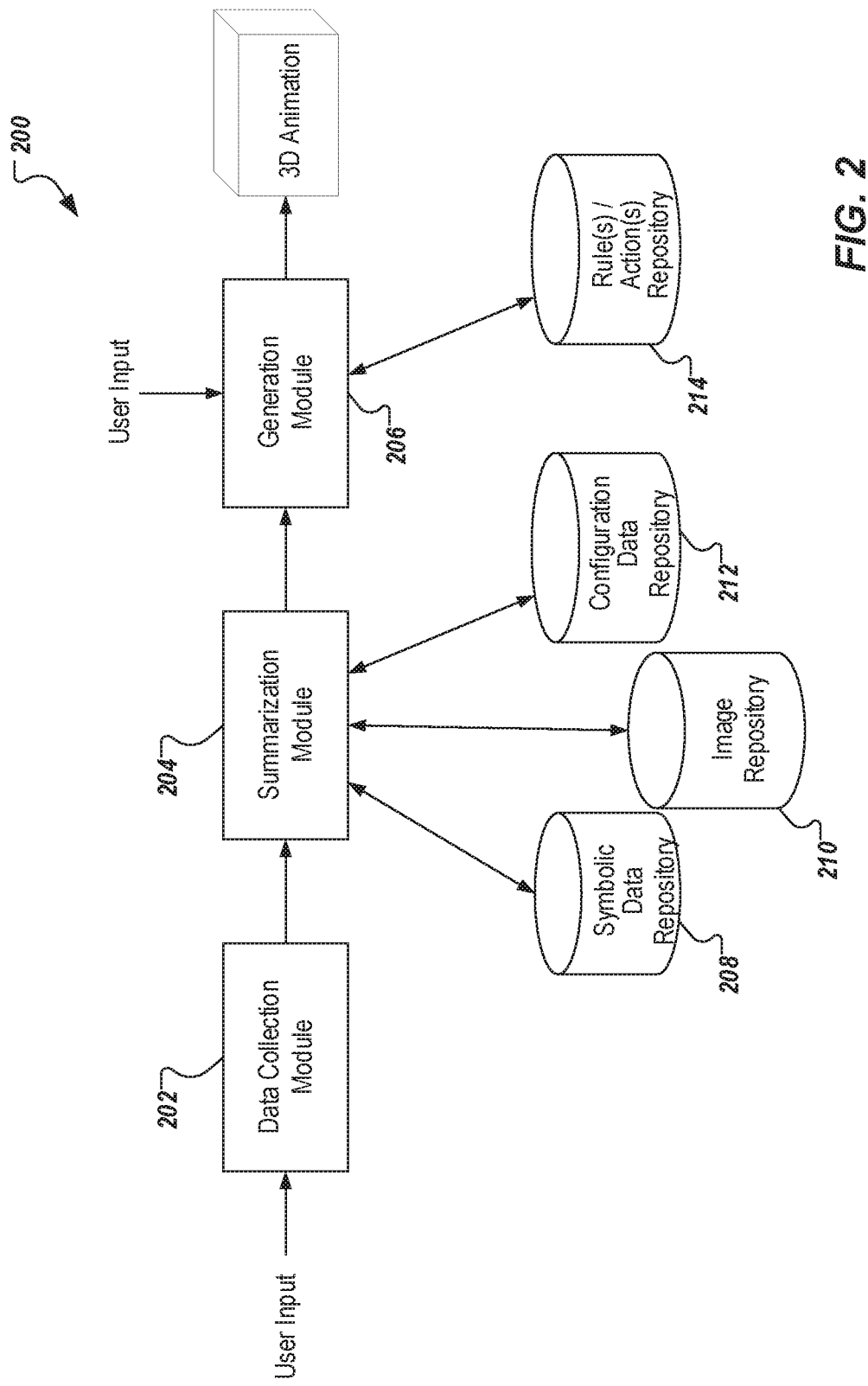
FIG. 2 schematically depicts an example 3D animation generation platform in accordance with implementations of the present disclosure.

FIG. 2 schematically depicts an example platform 200 in accordance with implementations of the present disclosure. The example platform 200 includes a data collection module 202, a summarization module 204, and a generation module 206. In some implementations, each of the data collection module 202, the summarization module 204, and the generation module 206 are provided as one or more computer-executable programs that can be executed using one or more computing devices (e.g., in the backend system 108 of FIG. 1).

In some implementations, the data collection module 202 receives a user input indicating that data should be collected to generate a 3D animation based on a 2D representation of a plan. The data collection module 202 processes the 2D representation of the plan to identify each of the elements included in the 2D representation and provides them to the summarization module 204. In some implementations, the summarization module 204 can receive and/or provide data to each of a symbolic data repository 208, an image repository 210, and a configuration data repository 212. The summarization module 204 can process (e.g., match, summarize and/or integrate) the symbolic data (e.g., characteristics of each symbolic element such as sizes, speed, skills, availability, duration of optimal functionality, strengths, or weaknesses), the images (e.g., images of the symbolic elements and setup), and the configuration data (e.g., geometrical, geographical, and geological characteristics of the area associated with the plan, including obstacles or other particular features of the area) to generate summarized data including at least a portion of the symbolic data, a portion of the images, and a portion of the configuration data.

In some implementations, the generation module 206 can receive summarized data from the summarization module 204, can retrieve one or more sets of rules from a rule or action repository 214, can receive a user input to define a new rule or update an old rule and can generate a 3D animation. In some implementations, the generation module 206 can process the received data to determine whether a rule conflict (error) has been identified. In some implementations, the rule set can be specific to a location type associated with the received data. For example, a first rule set can be associated with prohibited areas for particular elements (e.g., areas outside a game field) and a second rule set can be associated with preferred areas for particular elements (e.g., target areas). An example rule can provide that, if one or more symbolic elements collide with each other (e.g., overlap of trajectory points at a time point), it is determined that a planning error has occurred and an alternative plan is automatically generated and displayed for approval. As another example, the generation module 206 can provide instructions to a user to update the plan to avoid the identified conflict.

Figure 3:
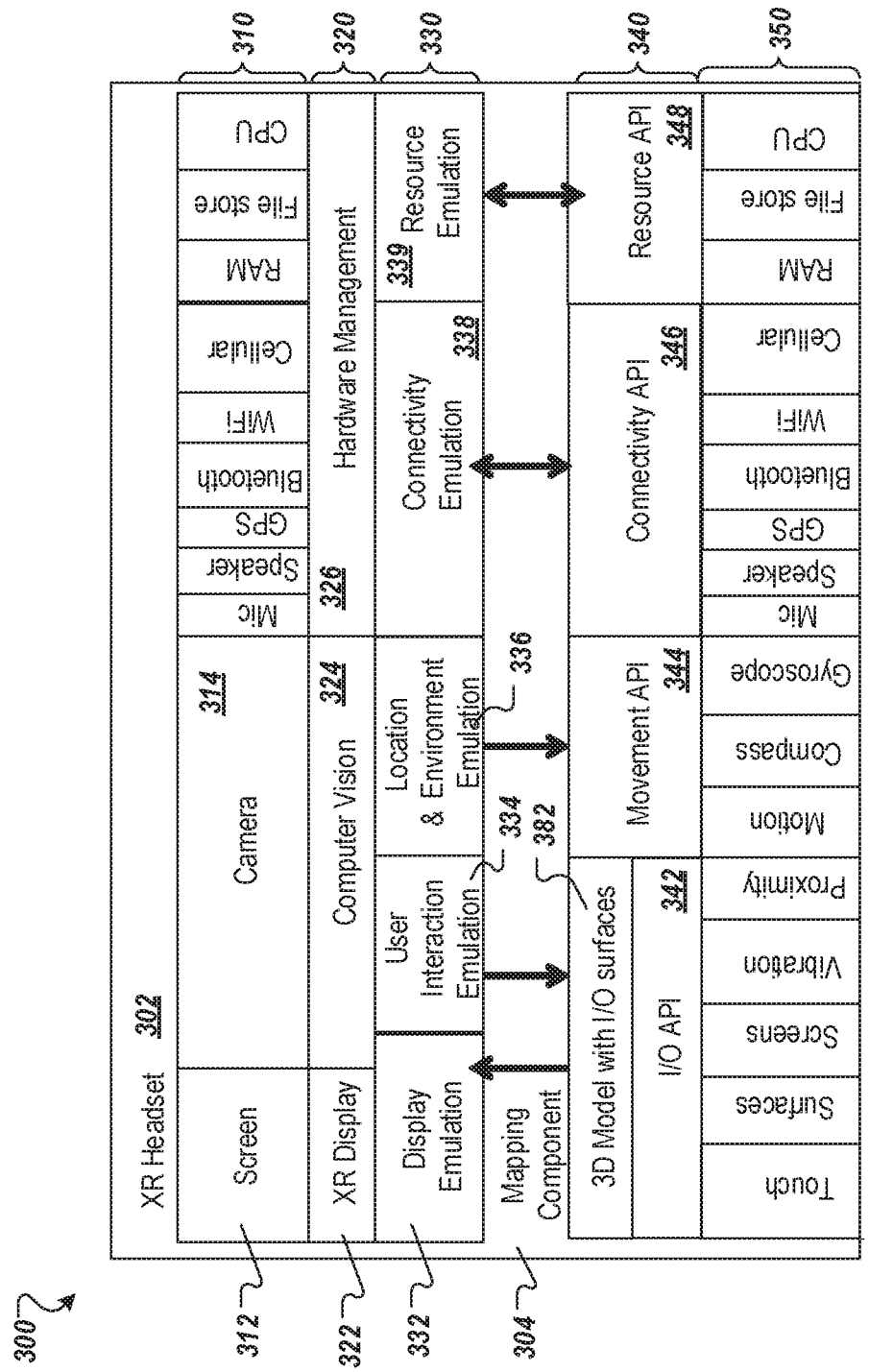
FIG. 3 is a schematic representation of an example device architecture to visualize 3D animations in accordance with implementations of the present disclosure.

FIG. 3 is a schematic representation of an example 3D viewing device 300. The 3D viewing device 300 includes an XR headset 302 and a hosted mapping component 304. Although the examples described in this disclosure uses an XR headset as the example AR/VR device or platform, the AR/VR device can include other types of 3D viewing devices, such as handheld AR/VR devices and wearable or non-wearable AR/VR devices.

A hosted mapping component 304 is a thick client that executes the majority of operations relating to the computing device configured to generate, display and update the map of the plan, on the XR headset device 302. The hosted mapping component 304 is suitable, but not required, for applications that require an instant response to user interactions (e.g., by taking advantage of the low latency design), that have multiple complex user interactions/gestures.

The XR headset device 302 can include, for example, headset hardware 310, headset core functionality 320, and headset device emulation layer 330. The headset hardware 310 includes physical hardware components, such as, one or more of a screen 312, a camera 314, a microphone, a speaker, a connectivity or communication (e.g., GPS, Bluetooth, WiFi, or cellular) interface, storage modules (e.g., a random access memory (RAM) and file/data store) and a processor (e.g., a central processing unit (CPU)). The headset core functionality 320 includes, for example, providing AR and/or VR representations by an XR display module 322, processing and analysing images, videos, or other media by a computer vision module 324, and managing hardware included or otherwise associated with the XR headset device 302 by a hardware management module 326. The hardware management module 326 can perform a number of tasks for the hosting XR device 302 as well as the hosted mapping component 304. For example, the hardware management module 326 manages the access of mapping components (e.g., via the device connectivity emulation 338) and device resource emulation 339. In addition, the hardware management module 326 will pass data (e.g., I/O data) between the XR headset 302 and their paired mapping components and also provide the data channel, for example, for a remotely hosted or hybrid mapping component, between the hosting client AR/VR device and the server-side component.

The headset device emulation layer 330 includes a software layer that enables mapping components to interpret the world around their virtual projections and how users interact with the symbolic elements of the virtualized projections of the map. The headset device emulation layer 330 includes, for example, display emulation module 332, user interaction emulation module 334, location and environment emulation module 336, connectivity emulation module 338, and resource emulation module 339.

For instance, the display emulation module 332 can illustrate the virtual display (e.g., the XR display 322) of the elements of the plan. For example, the display emulation module 332 can interpret the look of the map and pass it to the hosting hardware to be illustrated on the screen.

The user interaction emulation module 334 can identify, process, and respond to inputs to the map based on user actions (e.g., changing the location, orientation or other features of the virtualized map based on the user inputs). For example, the user interaction emulation 334 can interpret the user's touches, gestures and other physical interactions with the map that are received, for example, from the hosting hardware's computer vision module 324 and pass the interaction data to the mapping component via the input/output (I/O) application program interface (API) 342 of the 3D model 382.

The location and environment emulation module 336 can simulate the location and environment (e.g., spatial characteristics of the field) of the plan. The device location and environment emulation module 336 can interpret the resultant movement of the elements of the plan that are received, for example, from the hosting hardware's computer vision module 324, and passes the motion, orientation, and acceleration data to the mapping component via the movement API 344. The connectivity emulation module 338 can provide virtual connectivity capabilities, for example, enabled by the XR headset device 302. The resource emulation module 339 can provide and simulate resources available or accessible within the plan.

The mapping component 304 can include, for example, hardware emulation APIs 340 and device hardware glue logic 350. The hardware emulation APIs 340 includes, for example, I/O API 342, movement API 344, connectivity API 346, and resource API 348. The APIs 340 can provide input to and from the emulation layer 330.

In some implementations, the I/O API 342 can connect virtualized components presented in the 3D animation to the 2D representation displayed on a computing device and update various characteristics. For example, if a touch is made on a mapping component's virtualized touch-sensitive display, the I/O API 342 can receive the interaction from the emulation layer and then convert the interactions to location/action data that are transmitted to the computing device to update the 2D representation of the plan.

The movement API 344 can receive motion, orientation and acceleration data from the emulation layer 330 and can present the data to the computing device displaying the 2D representation. The movement API 344 can send data to the computing device displaying the 2D representation that relates to the movement and forces acting upon the virtualized device. For example, in the case of a compass, the data would be the new direction that the virtual device is facing. In the case of an accelerometer, the data can include changes in velocity of the virtual device. In some implementations, the data can also include data associated with altimeters.

The connectivity API 346 can serve as a bridge between the mapping component 304 and the computing device displaying the 2D representation using any of the available connectivity technologies (e.g., Bluetooth, near filed communications (NFC), GPS, WiFi, cellular communications, and cellular communications). Similar to the connectivity API 346, the resource API 348 can form a bridge between the mapping component 302 and the computing device displaying the 2D representation using any of the available storage formats. The hardware logic 350 can include logic that handles interactions associated with hardware such as, touch surfaces, screens, vibration generators, proximity sensors, motion detectors, compass, gyroscope, microphone, speaker, connectivity or communication (e.g., GPS, Bluetooth, WiFi, or cellular) interfaces, storage modules (e.g., a RAM and file/data store) and processors (e.g., CPUs).

Figure 4A:
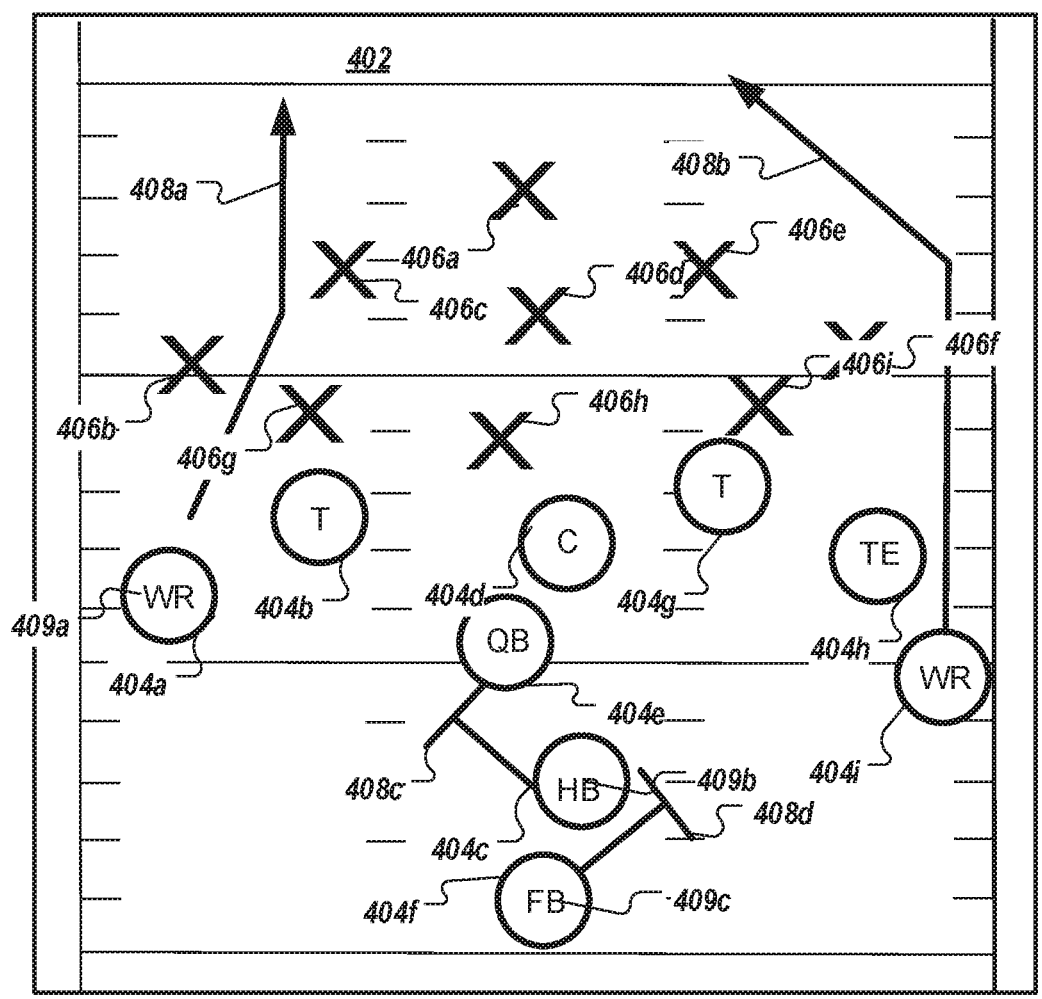
FIGS. 4A-4C schematically depict examples of 2D representations and frames of 3D animations in accordance with implementations of the present disclosure.

FIG. 4A depicts an example of a 2D representation of a plan 400. Within the context example, the 2D representation of the plan 400 corresponds to a game plan. However, as previously discussed, any type of interaction between multiple elements that can be visualized in 2D and 3D, respectively could be depicted. The 2D representation of the plan 400 includes a representation of the setting 402 (e.g., game field), a plurality of symbolic elements 404a-404i, 406a-406i and a plurality of action elements 408a-408d. In some implementations, the symbolic elements 404a-404i, 406a-406i can be represented by multiple different types of symbols (e.g., different geometrical forms) to indicate different group types (e.g., teams). One or more of the symbolic elements 404a-404i, 406a-406i can include alphanumeric identifiers 409a-409c to associate the symbolic elements to catalogued symbolic elements (e.g., symbolic elements with known associated characteristics such as height, weight, speed, skills, etc.). In some implementations, the action elements 408a-408d can be represented by multiple different types of vectors (e.g., arrows or limited segments) to indicate open trajectories or limited trajectories.

Figure 4B:
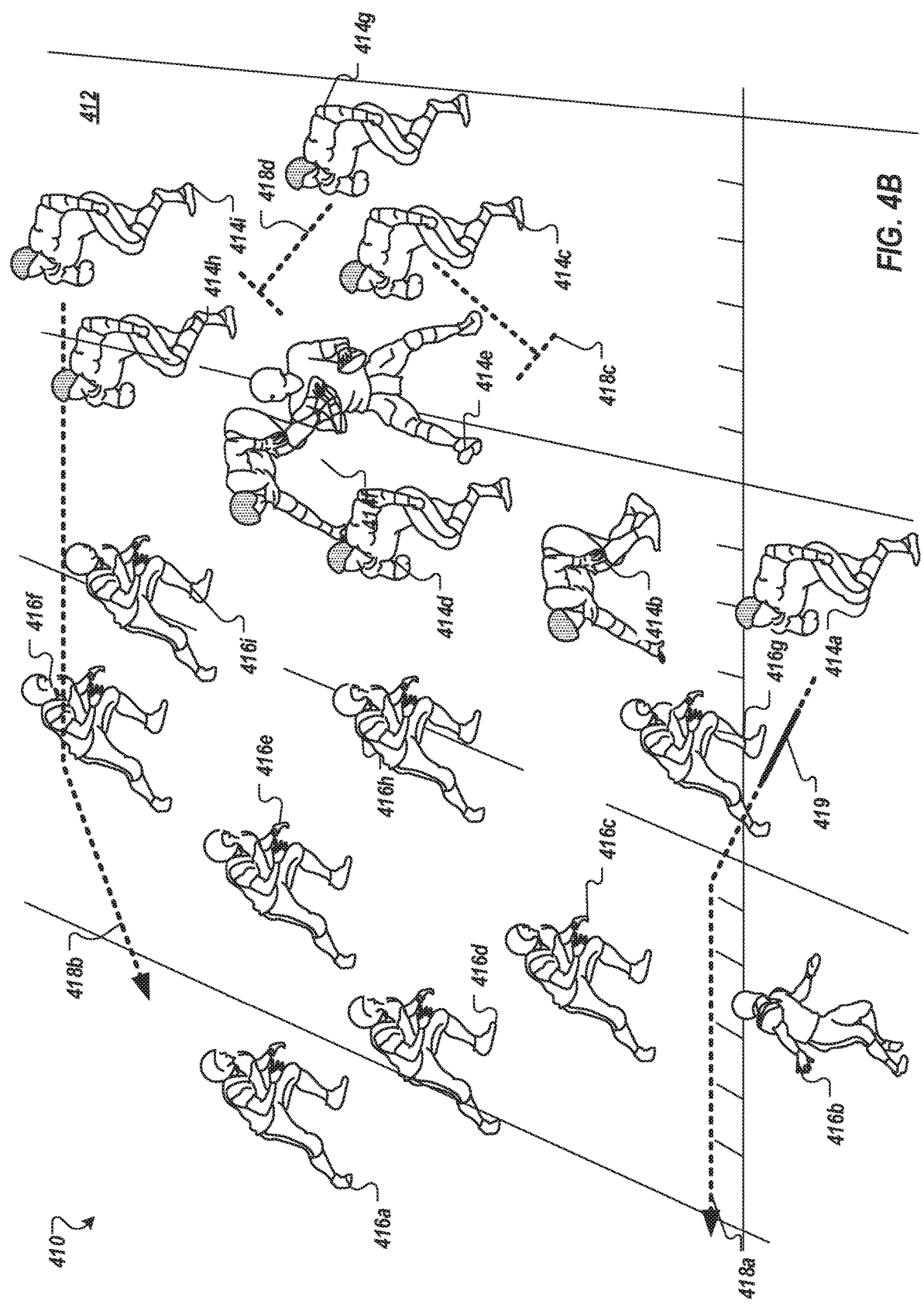

FIG. 4B depicts an example of a 3D representation of a plan 410 corresponding to the 2D representation of the plan 400. Within the context example, the 3D representation of the plan 410 corresponds to a game plan. However, as previously discussed, any type of interaction between multiple elements that can be visualized in 3D could be depicted. The 3D representation of the plan 410 includes a 3D representation of the setting 412 (e.g., game field), a plurality of symbolic elements 414a-414i, 416a-416i and a plurality of action elements 418a-418d. In some implementations, the symbolic elements 414a-414i, 416a-416i can be represented by realistically proportionate 3D representations of the symbolic elements (e.g., athletic players). In some implementations, the action elements 418a-418d can be represented by multiple different types of vectors (e.g., arrows or limited segments) to indicate open trajectories or limited trajectories. In some implementations, the action elements 418a-418d can be represented by lines with distinguishing features (e.g., dashed lines) and at least a portion of one of the action elements 418a includes a solid segment 419, indicating an action associated to a particular frame of the 3D representation of the plan 410.

Figure 4C:
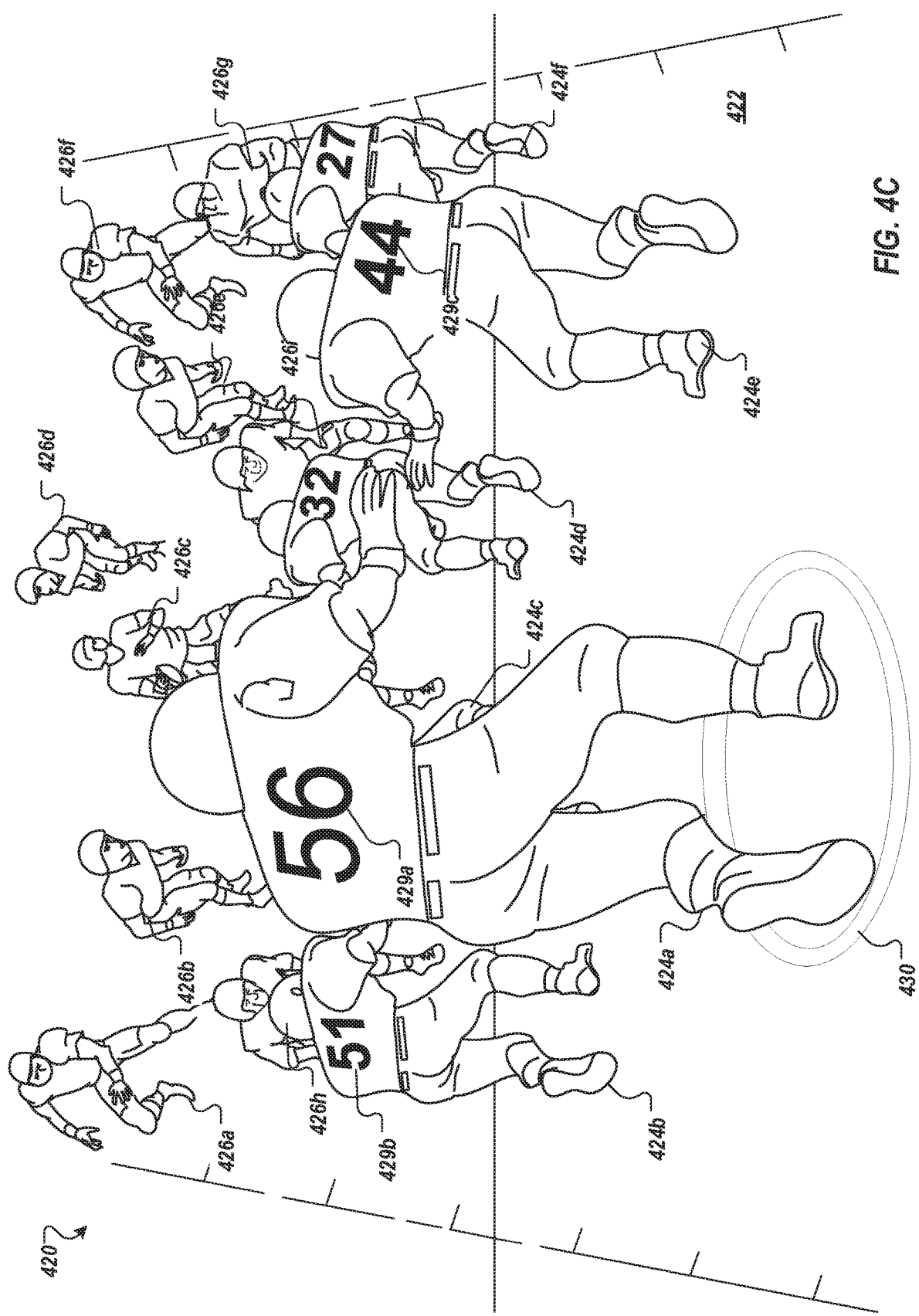

FIG. 4C depicts an example of a perspective frame of a 3D animation of a plan 420 corresponding to the 2D representation of the plan 400. Within the context example, the 3D animation of the plan 420 corresponds to a game plan. However, as previously discussed, any type of interaction between multiple elements that can be visualized in 3D could be depicted. The perspective frame of the 3D animation of the plan 420 includes a 3D representation of the setting 422 (e.g., game field) and a plurality of symbolic elements 424a-424i, 426a-426i. In some implementations, not all of the symbolic elements 424a-424i, 426a-426i are visible in all frames of the animation. For example, within a particular frame of the animation 420, if one or more symbolic elements are behind the reference point from which the perspective view is displayed, some symbolic elements are not visible. In some implementations, the symbolic elements 424a-424i, 426a-426i can be represented by realistically proportionate 3D representations of the symbolic elements (e.g., athletic players). One or more of the symbolic elements 424a-424i, 426a-426i can include markers 429a-429c (e.g., preset player number determined based on the alphanumeric identifiers 409a-409c). In some implementations, the symbolic element 424a associated to the perspective from which the 3D animation of the plan 420 is displayed can be highlighted by one or more features 430 (e.g., a circle projected within the associated respective location within each frame of the animation).

Figure 5:
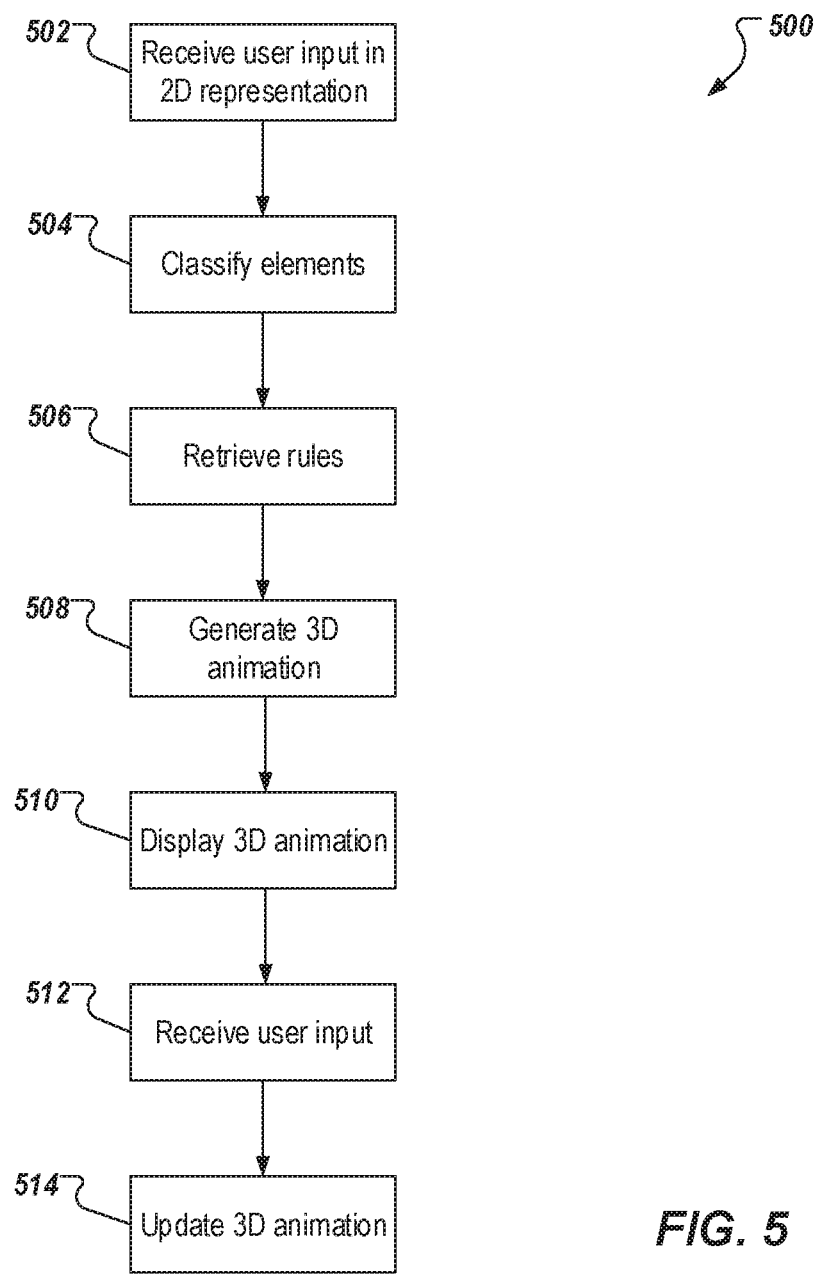
FIG. 5 is a flowchart depicting an example process that can be executed in accordance with implementations of the present disclosure.

FIG. 5 depicts an example process 500 that can be executed in implementations of the present disclosure. In some implementations, the example process 500 is provided using one or more computer-executable programs executed by one or more computing devices (e.g., the back-end system 108 of FIG. 1). The example process 500 can be executed to generate a 3D animation of a plan in accordance with implementations of the present disclosure. In some implementations, the example process 500 is initiated in response to a user input defining one or more parameters for selecting a plan type. For example, the user can select a plan associated with a particular element type (e.g., human, device, physical element, chemical element, or a combination of elements) and/or a particular application type. The application type can include an action type (e.g., a movie stunt, a show scene, an ultimate Frisbee game plan, a football game plan, a basketball game plan, a soccer game, a baseball game plan or any other type of team action), a particular transportation type (e.g., ground, air, water or a combination of them), and a particular scientific field (e.g., chemistry, physics, or biology). In response to the plan selection, the setting associated with the plan (e.g., characteristics of the area within which the plan will be set) can be uploaded on a display of a computing device. In some implementations, the example process 500 is initiated with a preset plan type or the plan can be automatically selected based on a user identifier.

A user input defining a 2D representation of a plurality of elements is received through a graphical user interface (GUI) of an application executed on a computing device (502). In some implementations, the user input can include an acceptance of a preset number of elements and groups of elements or can include a selection of the number of elements and element groups (e.g., teams). For example, a particular plan type can be associated with a set number of elements (e.g., a template of a game plan can be displayed with 18 players divided into two teams). The elements include symbolic elements and action elements. The symbolic elements can include elements configured to perform an action (e.g., human players, robots, vehicles, chemical elements or physical elements). The action elements can indicate an action associated to one or more symbolic elements.

In response to a user input that accepts the preset number of symbolic elements and element groups, the computing device can generate a standard map, which can be modified by the user through an additional user input to generate a customized plan. The additional user input can add, delete and/or modify symbolic elements their groups and their initial location and can add action elements for one or more of the symbolic elements. In some implementations, the user input can include element identifiers associated with one or more symbolic elements to enable retrieval of element characteristics.

The elements entered and/or updated by the user can be automatically classified by the processors of the computing device (504). The classification can include differentiating between symbolic elements, action elements and element identifiers and processing each of the elements. The symbolic elements can be processed to identify a group correspondence. The action elements can be processed to identify a direction of displacement, length of displacement, a trajectory, a speed of displacement, and/or a chemical or physical force associated to one or more of the symbolic elements. The element identifiers can be processed to determine an identity of each of the symbolic elements. In some implementations, one or more characteristics (e.g., physical features, skills, and attributes) for each of the symbolic elements can be retrieved based on the identity of each of the symbolic elements. In some implementations, the user can view, add, delete and/or modify the characteristics of the symbolic elements.

Rules are retrieved (506). The rules can define a conversion matrix that associates a 2D representation to a 3D representation of the plan and an inverse conversion matrix that associates a 3D representation to a 2D representation of the plan. The conversion matrix and the inverse conversion matrix can include geometrical rules for converting each of the symbolic elements from the 2D representation to the 3D representation and from the 2D representation to the 3D representation, respectively. The rules can include action rules that can be applied to determine the location of each symbolic element within each frame of the 3D representation. In some implementations, the rules can be plan specific. For example, the rules can be retrieved based on the selected plan type (e.g., avoiding collision between particular symbolic elements, maintaining the symbolic elements within a particular portion of the associated area, limits of the speed, the distance, and/or the action time of one or more of the symbolic elements). In some implementations, the rules can be associated to a particular symbolic element and/or a characteristic of the symbolic element. The rules can be retrieved from a storage medium of the computing device or an external database. In some implementations, the user can view, add, delete and/or modify the rules.

The 3D animation is automatically generated based on the symbolic elements, the action elements, and the rules (508). The automatic generation of the 3D plan increases the efficiency of the process and accuracy of the results, by eliminating potential errors. The 3D animation can include highlights of particular symbolic elements (e.g., players holding or passing) to assist a viewer in following a set of actions or a portion of the actions identified as key actions. The 3D animation can be generated by a device at the client side (e.g., computing device or XR device) or by a server. Performing the processing operations to generate the 3D animation at a server side can minimize the processing capacity requirements of the local computing devices. In some implementations, only a portion of the 3D animation is transmitted to one or more local and/or remote XR devices for display (510). The transmission of a limited portion of the data associated with the 3D animation, which is less than the total data associated with the 3D animation minimizes bandwidth requirements and improves the speed of data transmission. The portion of the 3D animation that is being transmitted can include the description of motion and the context of the motion. In some implementations, the portion of the 3D animation can be associated with a perspective of a user associated to a symbolic element. Within the context example, a 3D animation generated based on a 2D representation of a game drafted by a coach, can be sent to each of the players who can separately watch it through an associated XR device from their own perspective. In some implementations, the entire 3D animation is transmitted to the XR device and a user of the XR device can select a viewing angle and/or focal distance and can remove one or more symbolic elements from view to focus on a portion of the symbolic elements.

A user input is received (512). The user input can be received by the computing device displaying the 2D representation of the plan or the XR device displaying the 3D representation of the plan. The user input can indicate a modification of the plan (e.g., a change of the position and/or action of a symbolic element at a particular moment during the animation). In some implementations only particular users (e.g., identified based on user identifiers) can be enabled to modify the plan. Within the context example, a coach visualizing the plan on either the display of the computing device as a 2D representation or with an XR device as a 3D animation can be enabled to modify the plan and the players can be prohibited from modifying the plan. The modification can be sent in real-time to the computing device and the 3D animation can be automatically updated (514). In some implementations, the update of the 3D animation can be reflected by the 2D representation of the plan. In some implementations, the computing device and or the XR device can be configured to enable a user to pause, stop, replay, save and/or approve the plan. In some implementations, in response to receiving a user input approving the plan included in the 3D animation, the plan is automatically initiated. For example, if the plan includes non-human elements (e.g., robots, devices, physical elements or chemical elements), a command is triggered to initiate the actions included in the plan.

Implementations and all of the functional operations described in this specification can be realized in digital electronic circuitry, or in computer software, firmware, or hardware, including the structures disclosed in this specification and their structural equivalents, or in combinations of one or more of them. Implementations can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any appropriate form of programming language, including compiled or interpreted languages, and it can be deployed in any appropriate form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations can be realized on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any appropriate form of sensory feedback, e.g., visual feedback, auditory feedback, or tactile feedback; and input from the user can be received in any appropriate form, including acoustic, speech, or tactile input.

Implementations can be realized in a computing system that includes a back end component, e.g., as a data server, or that includes a middleware component, e.g., an application server, or that includes a front end component, e.g., a client computer having a graphical user interface or a Web browser through which a user can interact with an implementation, or any appropriate combination of one or more such back end, middleware, or front end components. The components of the system can be interconnected by any appropriate form or medium of digital data communication (e.g., a communication network). Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what can be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications can be made without departing from the spirit and scope of the disclosure. For example, various forms of the flows shown above can be used, with steps re-ordered, added, or removed. Accordingly, other implementations are within the scope of the following claims.

What is claimed is:

1. A computer-implemented method comprising:
   receiving a user input of a 2D representation of (i) one or more symbolic elements that are to be visualized as one or more objects in a desired 3D animation, and (ii) one or more action elements that each represent a respective trajectory of one or more of the objects in the desired 3D animation, and that are to not be visualized as an object in the desired 3D animation;
   determining that a particular trajectory associated with a particular action element would cause two or more particular objects to enter a prohibited zone in the desired 3D animation;
   in response to determining that the particular trajectory associated with a particular action element would cause two or more particular objects to enter the prohibited zone in the desired 3D animation, determining an alternative trajectory that will cause the two or more particular objects to avoid the prohibited zone in the desired 3D animation; and
   generating the desired 3D animation based on the 2D representation, comprising animating the two or more particular objects based on the alternative trajectory in lieu of the particular trajectory that is associated with the particular action element in the 2D representation.

2. The method of claim 1, comprising classifying the elements in the 2D representation as either symbolic element or action elements.

3. The method of claim 1, comprising obtaining animation characteristics for each of the symbolic elements.

4. The method of claim 1, wherein each of the action elements comprises a vector that indicates a direction and speed of displacement of an associated object.

5. The method of claim 1, comprising transmitting the generated 3D animation to an extended reality device, for output.

6. The method of claim 1, comprising adjusting a visual perspective associated with the generated 3D animation based on a user input at an extended reality device.

7. The method of claim 1, wherein the two-dimensional representation comprises a sketch overlaid on a sports playing field, including a sketched objects of a particular shape that each correspond to a symbolic element, and arrows emanating from the sketched objects that each correspond to an action element.

8. A non-transitory computer-readable storage medium coupled to one or more processors and having instructions stored thereon which, when executed by the one or more processors, cause the one or more processors to perform operations comprising:
   receiving a user input of a 2D representation of (i) one or more symbolic elements that are to be visualized as one or more objects in a desired 3D animation, and (ii) one or more action elements that each represent a respective trajectory of one or more of the objects in the desired 3D animation, and that are to not be visualized as an object in the desired 3D animation;

determining that a particular trajectory associated with a particular action element would cause two or more particular objects to enter a prohibited zone in the desired 3D animation;

in response to determining that the particular trajectory associated with a particular action element would cause two or more particular objects to enter the prohibited zone in the desired 3D animation, determining an alternative trajectory that will cause the two or more particular objects to avoid the prohibited zone in the desired 3D animation; and generating the desired 3D animation based on the 2D representation, comprising animating the two or more particular objects based on the alternative trajectory in lieu of the particular trajectory that is associated with the particular action element in the 2D representation.

9. The medium of claim 8, wherein the operations comprise classifying the elements in the 2D representation as either symbolic element or action elements.

10. The medium of claim 8, wherein the operations comprise obtaining animation characteristics for each of the symbolic elements.

11. The medium of claim 8, wherein each of the action elements comprises a vector that indicates a direction and speed of displacement of an associated object.

12. The medium of claim 8, wherein the operations comprise transmitting the generated 3D animation to an extended reality device, for output.

13. The medium of claim 8, wherein the operations comprise adjusting a visual perspective associated with the generated 3D animation based on a user input at an extended reality device.

14. The medium of claim 8, wherein the two-dimensional representation comprises a sketch overlaid on a sports playing field, including a sketched objects of a particular shape that each correspond to a symbolic element, and arrows emanating from the sketched objects that each correspond to an action element.

15. A system comprising:
one or more processors; and
a computer-readable storage device coupled to the one or more processors and having instructions stored thereon which, when executed by the one or more processors, cause the one or more processors to perform operations comprising:

receiving a user input of a 2D representation of (i) one or more symbolic elements that are to be visualized as one or more objects in a desired 3D animation, and (ii) one or more action elements that each represent a respective trajectory of one or more of the objects in the desired 3D animation, and that are to not be visualized as an object in the desired 3D animation;

determining that a particular trajectory associated with a particular action element would cause two or more particular objects to enter a prohibited zone in the desired 3D animation;

in response to determining that the particular trajectory associated with a particular action element would cause two or more particular objects to enter the prohibited zone in the desired 3D animation, determining an alternative trajectory that will cause the two or more particular objects to avoid the prohibited zone in the desired 3D animation; and generating the desired 3D animation based on the 2D representation, comprising animating the two or more particular objects based on the alternative trajectory in lieu of the particular trajectory that is associated with the particular action element in the 2D representation.

16. The system of claim 15, wherein the operations comprise classifying the elements in the 2D representation as either symbolic element or action elements.

17. The system of claim 15, wherein the operations comprise obtaining animation characteristics for each of the symbolic elements.

18. The system of claim 15, wherein each of the action elements comprises a vector that indicates a direction and speed of displacement of an associated object.

19. The system of claim 15, wherein the operations comprise transmitting the generated 3D animation to an extended reality device, for output.

20. The system of claim 15, wherein the operations comprise adjusting a visual perspective associated with the generated 3D animation based on a user input at an extended reality device.

* * * * *